United States Patent [19]

Sorko-Ram

[11] Patent Number: 5,128,194
[45] Date of Patent: Jul. 7, 1992

[54] ONE PIECE MOSAIC MIRROR WITH DECORATIVE PATTERN AND SURFACE GROOVE

[76] Inventor: Paul O. Sorko-Ram, 63412 M-66 N., Sturgis, Mich. 49091

[21] Appl. No.: 537,114

[22] Filed: Jun. 13, 1990

[51] Int. Cl.⁵ .................. B32B 3/30; B32B 31/28
[52] U.S. Cl. ........................ 428/172; 428/38;
428/156; 428/163; 428/164; 428/167; 428/201;
428/203; 428/204; 428/207; 428/209; 428/461;
428/523; 428/913.3; 428/912.2; 359/838;
359/839; 359/883
[58] Field of Search ............ 428/38, 172, 156, 163,
428/164, 167, 201, 203, 204, 207, 209, 461, 523,
912.2, 913.3; 354/838, 839, 883; D6/303, 305

[56] References Cited

U.S. PATENT DOCUMENTS

| | | | |
|---|---|---|---|
| 19,103 | 3/1934 | Assael | 41/22 |
| 243,200 | 6/1881 | Bradley | 428/912.2 X |
| 305,732 | 9/1884 | Stern | 428/912.2 X |
| 682,769 | 9/1901 | Thorpe | 427/260 |
| 1,053,937 | 2/1913 | Anderson | 427/277 |
| 1,407,461 | 2/1922 | Epstein | 427/197 |
| 1,604,459 | 10/1926 | Lyons | 428/912.2 X |
| 1,788,562 | 1/1931 | Colbert et al. | 428/201 |
| 1,804,508 | 5/1931 | Nicholson | 428/81 |
| 2,080,337 | 5/1937 | Powell | 428/912.2 X |
| 2,162,590 | 6/1939 | Richter et al. | 428/912.2 X |
| 2,807,111 | 9/1957 | Turner | 41/22 |
| 3,094,430 | 6/1963 | Skwierinski | 428/912.2 X |
| 3,861,989 | 1/1975 | Ashenfurb et al. | 428/912.2 X |
| 3,912,842 | 10/1975 | Swartz | 428/912.2 X |
| 4,473,424 | 9/1984 | Sorko-Ram | 428/912.2 X |
| 4,520,053 | 5/1985 | Marentic | 428/31 |
| 4,842,921 | 6/1989 | Sorko-Ram | 428/187 |
| 4,851,061 | 7/1989 | Sorkoram | 156/63 |
| 5,013,592 | 5/1991 | Culpepper | 428/912.2 X |

FOREIGN PATENT DOCUMENTS

| | | | |
|---|---|---|---|
| 251308 | 5/1964 | Australia | 428/912.2 |
| 2132555 | 7/1984 | United Kingdom | 428/203 |

*Primary Examiner*—Ellis P. Robinson
*Assistant Examiner*—William P. Watkins, III
*Attorney, Agent, or Firm*—Krass & Young

[57] ABSTRACT

A decorative mirror 10 is made from a transparent sheet of arcylic 12 that has a front surface 14 and a rear surface 16. Opaque colored layers 20 and 22 are deposited on a first area 18 of the rear surface 16. A reflective coating 28 is deposited on the rear surface and is visible from the front surface at a second area 26. The second area 26 and first area 18 form a border 30. A laser beam 40 forms grooves 33 on the front surface 14 aligned over the border 30 between layers 20, 22 and 28 to form a simulated mosaic piece in which the grooves 33 simulate a border between separate mosaic pieces.

9 Claims, 1 Drawing Sheet

U.S. Patent  July 7, 1992  5,128,194
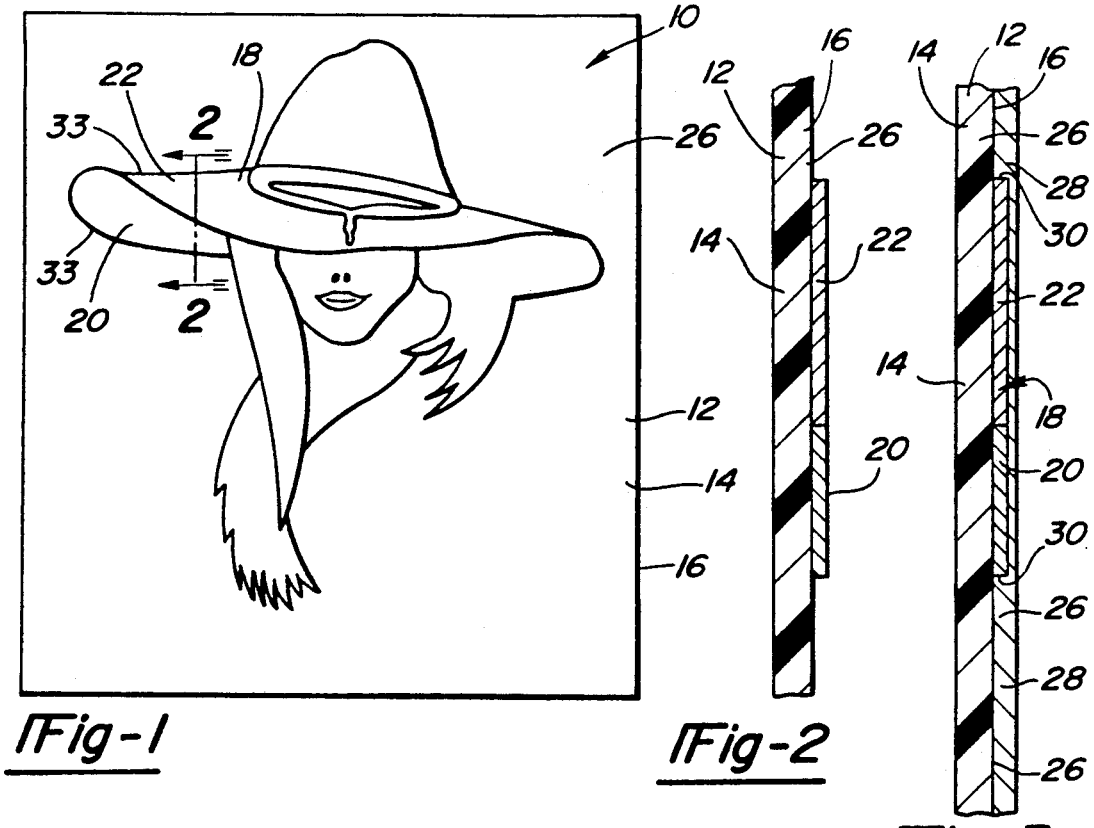
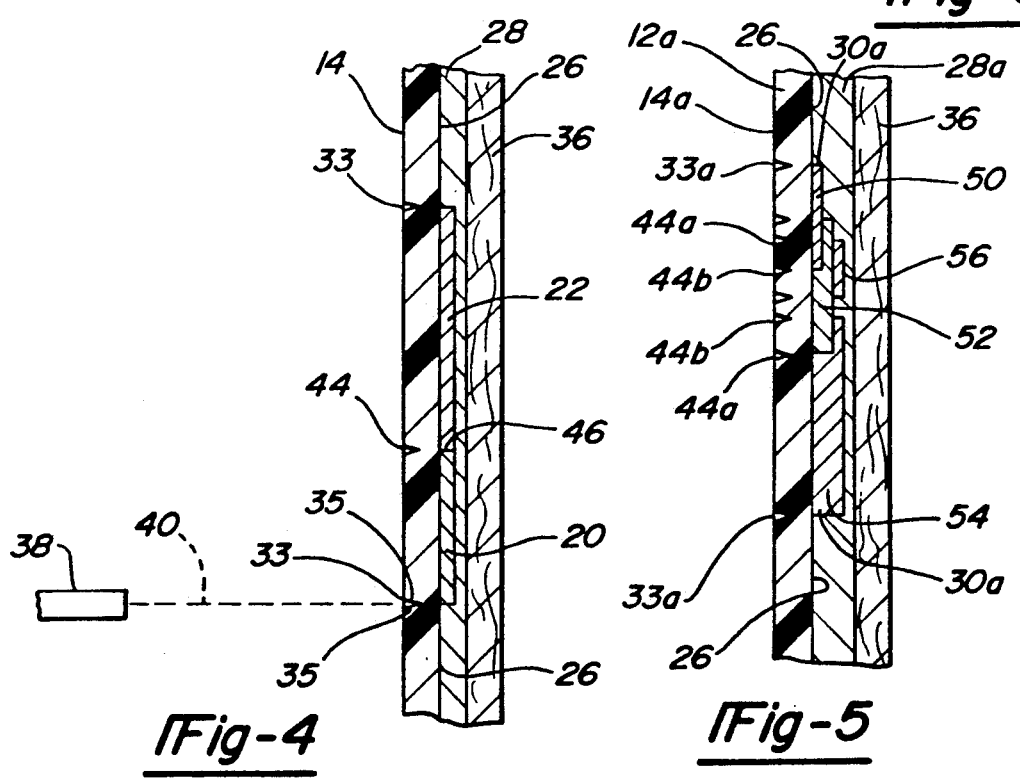

ONE PIECE MOSAIC MIRROR WITH DECORATIVE PATTERN AND SURFACE GROOVE

FIELD OF THE INVENTION

This invention relates to decorative mirrors and more particularly to ornamental mirrors made from thermoplastic material that has a design silk-screened on its back surface and is grooved by a laser beam on its front surface.

BACKGROUND OF THE INVENTION

Decorative mirrors have long been a popular item. Decorative mirrors are commonly created from a transparent glass plane having its rear surface silk-screened or otherwise patterned to form a design. A reflective coating is then deposited on the rear surface of the pane so that the design remains visible when viewed from the front surface of the glass pane.

Alternatively, the rear surface of a transparent sheet of material can have a design made from an opaque collage and the front surface can have a reflective coating thereon. Removal of a desired section of the reflective coating reveals sections of the rear collage.

Another attractive decorative mirror is formed by cutting shaped mosaic pieces from differently tinted sheets of transparent thermoplastic acrylic material with a laser and assembling the tinted pieces together on a substrate. The rear surface of each mosaic piece may have a reflective coating deposited thereon.

Mosaic decorative mirrors are attractive not only due to the reflective coating on the back side and the contrasting tints of the different mosaic pieces, but also due to optically shiny interruptions from the smooth edges of each mosaic piece. A major drawback to mosaic decorative mirrors is the high cost involved in cutting each piece and assembling the mosaic together.

What is needed is a decorative mirror that simulates a mosaic but is made from one piece of transparent material which eliminates the necessity of costly assembly.

SUMMARY OF THE INVENTION

In accordance with one aspect of the invention, a decorative mirror includes a transparent sheet of material, preferably acrylic plastic, that has a front surface and a rear surface. The rear surface has a first area with a picture or other pattern applied thereto. The picture or pattern can be made from opaque inks that are silk-screened onto the rear surface. Alternatively, transparent inks may be used in a full four-color process. The picture or decorative pattern may be complex or may merely consist of the first area on the rear surface that has a colored layer applied thereto. A secondary area outside of the picture or pattern may have reflective material applied thereto that is visible from the front surface. The reflective material can preferably be vapor deposited onto the rear surface after the opaque or transparent inks are applied thereto. When the reflective material is applied over transparent inks, the reflective material behind the ink layer is also seen through the inks. The border between the exposed reflective coating and the colored layer and selective borders between different colors are then aligned with a laser beam from a $CO_2$ laser that is directed onto the front surface of the transparent sheet. The laser beam forms grooves in the front surface of the sheet. Each groove has an optically reflective surface.

In particular applications, the transparent sheet may be glass and the laser beam may emanate from a yag laser to produce grooves with a polished surface in the glass surface.

The finished product as viewed from the front has the appearance of a multi-piece mosaic assembled together without any assembly required of different mosaic pieces. The grooves formed by the laser beam have polished surfaces to optically reflect light. Because the grooves are aligned directly over the borders between different colors or between the reflective coating and the picture or pattern, it appears that the groove actually separates one color from the other and from the exposed mirrored reflective surface which simulates a multi-piece mosaic.

BRIEF DESCRIPTION OF THE DRAWINGS

Reference now is made to the accompanying drawings in which:

FIG. 1 is a plan view of a decorative mirror in accordance with one embodiment of the invention;

FIG. 2 is a cross-sectional view taken along section 2—2 which shows two layers of opaque ink applied by silk screen process onto the rear surface of the transparent sheet shown in FIG. 1;

FIG. 3 discloses a view similar to FIG. 2 after the reflective coating has been vapor deposited on the rear surface of the transparent sheet;

FIG. 4 is a view similar to FIG. 3 showing a laser beam directed onto the front surface of the transparent sheet to form a groove aligned with the borders of the silk screen layers; and FIG. 5 is a view similar to FIG. 4 disclosing an alternate embodiment in which transparent inks instead of opaque inks are applied to the rear surface of the transparent sheet.

DETAILED DESCRIPTION OF THE PREFERRED EMBODIMENTS

Referring now to FIG. 1, a decorative mirror 10 includes a transparent sheet 12 of methyl-acrylic thermoplastic material which has a front surface 14 and a rear surface 16 which can be seen through the transparent sheet 12. The rear surface 16 has a first area 18 which can include one or more colors of opaque colored layers 20 and 22. A second area 26 can include a reflective coating 28 which can be vapor deposited onto the rear surface 16.

The first area 18 and second area 26 abut each other along a border 30. The front surface 14 has a groove 33 therein. The groove 33 has optically polished surfaces 35 to reflect light caused by polymerization of the acrylic material. The groove 33 also is transversely aligned with the border 30 on the rear surface so that when one looks directly at the mirror 10, an optical illusion is formed in which the groove 33 seems to separate the first area 18 from the second area 26.

As shown in FIG. 2, the colored layers 20 and 22 are applied to the rear surface 16 of transparent sheet 10 via conventional silk screen methods. The reflective layer 28 is then vapor deposited on the rear surface 16 and also behind layers 20 and 22 as shown in FIG. 3.

As shown in FIG. 4, a protective backing 36 is applied behind the reflective layer 26 and secured thereto with appropriate adhesives or fasteners.

A carbon dioxide laser 38, directs a beam 40 onto the front surface 14 of the transparent sheet 12 to create the grooves 33 which are aligned with the border 30 between the first area 18 and second area 26 with respect to an axis 41 which is perpendicular to the surfaces 14 and 16. Each groove 33 has polished surfaces 35 which are polymerized by the heat of beam 40 to be optically reflective of light. Furthermore, optional grooves 44 may be formed in the front surface 14 that are aligned between the border 46 between the first color layer 20 and the second color layer 22 of differently colored opaque inks.

The embodiments shown in FIGS. 1-4 disclose a relatively simple decorative pattern formed by silk screening process with only two different opaque ink layers. Alternatively, complex patterns can be made with a variety of different colors using transparent inks as disclosed in FIG. 5. The transparent inks can be multi-layered as shown by layers 50, 52, 54 and 56. Because each layer has a transparency to it, the multi-layering of the different layers blends colors to create a full spectrum of color as shown from the front surface 14a of transparent sheet 12a. As shown, layer 54 partially overlies layer 52 which in turn partially overlies layer 50. By using the transparent inks, a difference in coloration can also be achieved by placing one layer 56 totally behind other layers 50 and 52. The difference in coloration can be seen from surface 14a.

A reflective coating 28a is vapor deposited on the rear surface and on top of the layers 50, 52, 54 and 56 of transparent inks. Grooves 33a are formed in the same manner as shown in FIG. 4, aligned with the border 30a between the layers 54, 50, and 28a. Other grooves 44a may be aligned with the edge of one layer 52 with respect to a second layer 54. Other grooves 44b may be applied to other areas where a difference in coloration will be seen from front surface 14a such as the area defined by the edge of layer 56. Artistic discretion can be used where minor color variations may not have a groove aligned therewith.

It should be understood that the depth of the 20, 22, 28, 50, 52, 54, 56 and 28a layers are highly exaggerated for illustrative purposes only and may in reality be extremely thin.

The acrylic sheet 12 may be replaced by other transparent materials such as glass if the appropriately powered laser such as a yag laser replaces the carbon dioxide laser 38 to create grooves with polished surfaces.

In this fashion, a decorative mirror may be easily manufactured by applying sequential layers by either silk screening or full four-color process on a rear surface of a transparent sheet, then applying a reflective coating on the rear surface and then etching the front surface such that a groove is formed aligned with the borders between the reflective material and the silk screen or transparent ink layers to simulate an assembled mosaic without the need for cutting and subsequent assembly of multiple pieces onto a substrate.

The use of a laser beam directed onto the front surface to form a groove provides a groove with a polished optically reflective surface which by being placed at the borders of differing colors or between the reflective layer 28 and the other layers, simulates a border between multiple pieces of different colored glass or plastic without the need for assembling multiple pieces.

Other variations and modifications are possible within the scope and spirit of the invention as defined by the appended claims.

The embodiments in which an exclusive property or privilege is claimed are defined as follows:

1. A patterned mirror characterized by:
   a transparent sheet material having a front surface and a flat rear surface;
   a first area of said rear surface being coated with an opaque colored layer;
   a second area of said rear surface being coated with a light reflective layer and abutting said opaque colored layer in said first area to form a border between said two areas; and
   said front surface having a groove formed therein aligned with said border, said groove extending through a portion of said sheet material and terminating short of said rear surface.

2. A patterned mirror as defined in claim 1 further characterized by:
   said transparent sheet material being made from acrylic plastic.

3. A patterned mirror as defined in claim 2 further characterized by:
   said groove being formed by a laser beam directed onto the front surface of said acrylic plastic transparent sheet of material to polymerize said portion of material and form optically reflective surfaces defining said groove.

4. A decorative mirror characterized by:
   a transparent sheet of material having a front and a flat rear surface;
   at least one transparent ink applied to said rear surface in a first area having an edge thereof;
   a reflective layer deposited on said rear surface;
   said front surface having a groove therein aligned transversely with respect to the front and rear surfaces to said edge of said area with said at least one transparent ink, said groove extending through a portion of said sheet material and terminating short of said rear surface.

5. A decorative mirror as defined in claim 4 further characterized by:
   said transparent sheet of material being acrylic plastic.

6. A decorative mirror as defined in claim 4 further characterized by:
   said groove being formed by a laser beam directed onto said front surface of said transparent sheet of material to polymerize said portion of material and form optically reflective surfaces defining said groove.

7. A decorative mirror as defined in claim 6 further characterized by:
   said reflective layer covering said first area with said at least one transparent ink interposed between said reflective layer and said rear surface of said sheet.

8. A decorative mirror as defined in claim 7 further characterized by:
   said at least one layer of transparent ink includes a first layer of transparent ink of one color and a second layer of transparent ink of a second color; and
   said second layer at least partially overlies said first layer.

9. A decorative mirror as defined in claim 4 further characterized by:
   said reflective layer covering said first area with said at least one transparent ink interposed between said reflective layer and said rear surface of said sheet.

* * * * *